Dec. 1, 1942.   M. LIWSCHITZ   2,303,481
SYNCHRONOUS GENERATOR HAVING SPECIAL DAMPER WINDINGS
Filed Aug. 22, 1941
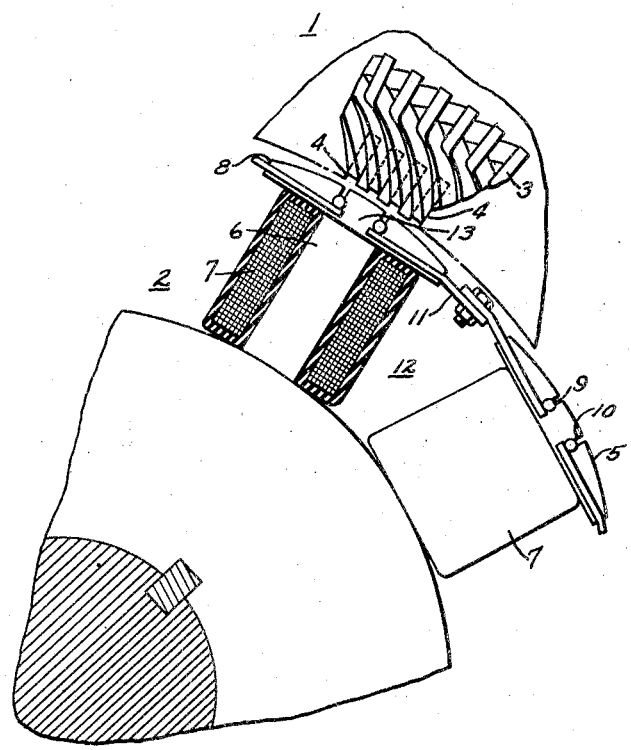
WITNESSES:
Leon M. Garman
Nn. C. Groome
INVENTOR
Michael Liwschitz.
BY O. B. Buchanan
ATTORNEY Patented Dec. 1, 1942

2,303,481

UNITED STATES PATENT OFFICE 2,303,481

SYNCHRONOUS GENERATOR HAVING SPECIAL DAMPER WINDING

Michael Liwschitz, Wilkinsburg, Pa., assignor to Westinghouse Electric & Manufacturing Company, East Pittsburgh, Pa., a corporation of Pennsylvania Application August 22, 1941, Serial No. 407,940

1 Claim. (Cl. 171—252)

My invention relates to salient pole synchronous machines having a novel type of damper winding which has various operational advantages which will subsequently be described.

The effect of the damper winding, in a salient-pole synchronous machine, may be considered under the heading of three considerations, namely, damping torque, negative-sequence reactance, and telephone-interference, which may be of relatively different importance, in different cases.

The purpose of applying a damper winding to a synchronous machine is to produce a torque which will serve as a damping torque during oscillations, or which will serve as a starting-torque, during starting-conditions.

The addition of a damper winding to a machine has the disadvantageous effect, however, of reducing the subtransient reactances of the machine in both the direct axis and the quadrature axis. The initial value of the short-circuit currents, in case of a three-phase short-circuit on the machine, depends upon the subtransient reactance in the direct axis, and hence these short-circuit currents are increased when a damper winding is added to the machine. In the case of single-phase short-circuits on the machine, the initial value of the short-circuit current depends upon the negative-sequence reactance of the machine, which is the average between the subtransient reactances in the direct and quadrature axes; and hence the addition of a damper winding to the machine increases the single-phase short-circuit currents of the machine. These short-circuit currents are the largest during the first two or three cycles, and then gradually decrease to a smaller steady-state value, but during the brief moment when the short-circuit currents are the largest, the mechanical strains resulting from the magnetic forces produced by the heavy current-flow must nevertheless be reckoned with, in the design of the synchronous machine, imposing a mechanical strain on the machine, which the machine is supposedly designed to be able to withstand, but nevertheless imposing a strain and a risk of failure of the machine under such conditions. In certain special applications, notably on shipboard for ship-propulsion, where reliability is of paramount importance, it is frequently specified, by the purchaser, that the synchronous machine shall have a high subtransient reactance in the direct axis, or a low short-circuit current, while at the same time having a high specified damping torque, making it particularly hard for the designer to meet these two contradictory requirements.

The third effect of the damper winding is the fact that the damper-winding bars, and the slots in which they are placed, produce tiny pulsations in the voltage-wave of the generator-voltage, producing current-ripples which may sometimes involve considerable telephone-interference. While this is not important on shipboard, it is nevertheless quite important on certain small or medium-sized generators which are used on land, and which have relatively small air-gaps, so that the damper-bar pulsations are quite strong, and therefore quite objectionable from the standpoint of telephone-interference, whereas, in large machines, with larger air-gaps, this telephone-interference factor is not a problem at all.

The object of my invention is to produce a novel form of damper winding which will mitigate both of the drawbacks respecting subtransient reactance and telephone-interference, while improving the damping torque, over the practices heretofore prevailing in machines of the types just discussed.

Heretofore, a common type of construction of the machines in question has involved the use of end-connecting damper-winding segments which extend only across the ends of the several pole-pieces, without extending across the interpolar space, the damper bars being distributed across the pole faces of the various salient pole-pieces and being connected to the aforesaid segments. In this way, the end-connecting segments of the damper windings were disconnected in the interpolar space, which was done for the purpose of considerably increasing the negative-sequence reactance, which it did by increasing the subtransient reactance of the machine in the quadrature axis or interpolar space. By means of this construction of the prior art, the negative-sequence reactance, in a typical case, such as a 48-pole, 2500 kva. generator, was increased by fifty per cent over what it would have been if the end-connecting segments of the damper winding had been extended completely around the circumference of the machine so as to span the interpolar spaces, and this fifty per cent increase in the negative-sequence reactance of the machine was so important to obtain, that the designers built the machine in this manner, even though the damping torque was reduced to only 30% of the value which it had when the complete damper winding was utilized. I believe that the reason why such a large reduction in the damping torque was obtained by the omission of the damping-winding segments across the interpolar spaces is because the larger part of the damping torque is produced by a reaction between the currents induced in the damper winding by the flux in the quadrature axis of interpolar space, reacting with the flux in the main or direct axis of the machine, or the axis centering on the respective salient pole-pieces. Moreover, this prior-art practice of omitting the interpolar segments of the damping winding has had no effect on the telephone-interference factor, as compared to a complete damper winding.

I believe that the last-mentioned solution of the difficulty respecting damping windings is an erroneous solution of the problem. I believe that the best solution is to reduce the damping effect of the damping winding in the direct axis, while making the damping effect as large as practicable in the quadrature or interpolar axis. In order to accomplish the purposes outlined above, I dispose the end connecting-segments of my damping winding so as to extend only across the interpolar space, and not across the center of any pole-piece, and I reduce the number of damper bars to a minimum, and place these damper bars close to the centers of the respective pole-pieces, so that the loops formed by the bars and end-segments will span as much as possible of the interpolar or quadrature-axis flux which extends as a sinusoidal half-wave from the center of one pole-piece to the center of the next adjacent pole-piece. By reducing the number of damper bars, and by reducing the area of the direct-axis pole-faces which is encircled by any two damper-bars which are connected to the above-described end-connecting segments, and by cutting, or interrupting the continuity of, the end-connecting segments at the center of each pole-piece, I reduce the damping effect to a minimum, in the direct-axis, thereby making the subtransient reactance in this axis as large as possible, so far as the damper winding is concerned. This reduction in the subtransient reactance of the machine in the direct axis reduces the initial value of the short-circuit currents as above described, and the reduction of the number of damper bars also materially reduces the telephone-interference factor.

The invention will best be understood by reference to the accompanying drawing, the single figure of which is a fragmentary diagrammatic end-view of a synchronous generator embodying my invention.

As shown in the drawing, my invention is applied to a salient-pole synchronous generator comprising a stator member 1 and a rotor member 2, the stator member having a primary winding 3 disposed in primary slots 4, and the rotor member comprising a plurality of salient pole-pieces 5 having shank portions 6 carrying direct-current field-exciting windings 7, and having enlarged pole-face portions 8 carrying a small number of damper-bars 9 bunched together near the center of each pole-piece, and disposed in partly closed slots 10 in the pole-piece. The damper bars are joined, at the ends, by end-connecting segments 11 which extend across the interpolar space 12, but which do not extend across the center 13 of the respective pole-pieces, these end-connecting segments being connected to the ends of the respective damper-bars 9, as shown.

The effect of the foregoing construction, as previously explained, is to produce a generator having a fairly high negative-sequence reactance, and also a fairly high damping torque. At the same time, as compared to a complete damper winding having damper-bars spread out over the entire face of the pole-face portions 8, my improved damper winding has a relatively smaller telephone-interference factor.

I claim as my invention:

A salient-pole synchronous machine having a damper winding on the salient pole pieces, characterized by said damper winding having end-connecting segments extending only across the interpolar space and not across the center of any pole piece, and a small number of centrally disposed damper bars connected to each segment, said damper bars being bunched near the center of each pole piece.

MICHAEL LIWSCHITZ.